US012427825B2

(12) United States Patent
Ali et al.

(10) Patent No.: US 12,427,825 B2
(45) Date of Patent: Sep. 30, 2025

(54) VEHICLE RAMP ANGLE CONTROL (71) Applicant: JAGUAR LAND ROVER LIMITED, Coventry (GB)

(72) Inventors: Syed Asad Ali, Coventry (GB); Luke Birch, Mickleton (GB); Dennis Lausecker, Coventry (GB); Sam Brown, Kingsbridge (GB); Anesh Mistry, Coventry (GB); William Burdock, Sutton Coldfield (GB); James Kelly, Solihull (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 15 days.

(21) Appl. No.: 18/039,238

(22) PCT Filed: Nov. 26, 2021

(86) PCT No.: PCT/EP2021/083090
§ 371 (c)(1),
(2) Date: May 27, 2023

(87) PCT Pub. No.: WO2022/112467
PCT Pub. Date: Jun. 2, 2022

(65) Prior Publication Data
US 2024/0059118 A1    Feb. 22, 2024

(30) Foreign Application Priority Data

Nov. 27, 2020 (GB) ..................... 2018683

(51) Int. Cl.
*B60G 17/0165* (2006.01)
*B60G 17/0195* (2006.01)

(52) U.S. Cl.
CPC ..... *B60G 17/0165* (2013.01); *B60G 17/0195* (2013.01); *B60G 2400/0511* (2013.01);
(Continued)

(58) Field of Classification Search
CPC ............ B60G 17/0165; B60G 17/0195; B60G 2400/0511; B60G 2400/0512;
(Continued)

(56) References Cited

U.S. PATENT DOCUMENTS 5,159,554 A * 10/1992 Buma ................ B60G 17/0155
280/5.513
5,619,413 A *  4/1997 Oakley ................ B60G 17/017
280/5.514

(Continued)

FOREIGN PATENT DOCUMENTS

DE    102012004201 A1    10/2012
DE    102020000209 A1     9/2020
(Continued)

OTHER PUBLICATIONS

International Search Report and Written Opinion for Application No. PCT/EP2021/083090, dated Mar. 21, 2022, 18 pages.
(Continued)

*Primary Examiner* — Logan M Kraft
*Assistant Examiner* — John D Bailey
(74) *Attorney, Agent, or Firm* — TROUTMAN PEPPER LOCKE LLP; Dustin B. Weeks; Nicholas H. Doss (57) ABSTRACT A control system (300) for controlling an active suspension system (104) of a vehicle (100), the control system comprising one or more controller (301), wherein the control system is configured to: detect (1004) a ramp (202) approached by an overhang of the vehicle; and in dependence on detecting the ramp, control (1020) the active suspension system to modify a relative ride height between a leading ride height at a set of leading wheels (FL, FR) of the vehicle and a trailing ride height at a set of trailing wheels (RL, RR) of the vehicle, to increase a ramp angle (α, β) of the vehicle relative to the ramp.

20 Claims, 5 Drawing Sheets (52) U.S. Cl.
CPC .. *B60G 2400/0512* (2013.01); *B60G 2400/10* (2013.01); *B60G 2400/20* (2013.01); *B60G 2400/82* (2013.01); *B60G 2401/14* (2013.01); *B60G 2500/30* (2013.01)

(58) Field of Classification Search
CPC ............ B60G 2400/10; B60G 2400/20; B60G 2400/82; B60G 2401/14; B60G 2500/30
USPC .......................................................... 701/37
See application file for complete search history.

(56) References Cited

U.S. PATENT DOCUMENTS

| | | | | |
|---|---|---|---|---|
| 6,441,623 | B1* | 8/2002 | Moon | B60Q 9/007 324/661 |
| 7,136,731 | B2* | 11/2006 | Lu | B60R 16/0233 701/70 |
| 2001/0044685 | A1* | 11/2001 | Schubert | B60G 17/0165 701/50 |
| 2005/0090956 | A1* | 4/2005 | Ogawa | B60G 17/08 701/532 |
| 2016/0046167 | A1* | 2/2016 | Lenain | B60G 17/0162 701/38 |
| 2017/0080770 | A1* | 3/2017 | Irwin | B62D 35/00 |
| 2017/0203626 | A1* | 7/2017 | Guest | B60G 17/0165 |
| 2017/0320495 | A1* | 11/2017 | Lu | B60W 50/10 |
| 2018/0037082 | A1* | 2/2018 | Unger | B60G 17/01908 |
| 2020/0231016 | A1* | 7/2020 | Vente | B60G 17/0165 |
| 2020/0239000 | A1* | 7/2020 | Chen | G01S 19/42 |
| 2020/0398627 | A1* | 12/2020 | Zecherle | B60G 17/00 |
| 2021/0245752 | A1* | 8/2021 | Scott | B60W 50/14 |
| 2021/0252932 | A1* | 8/2021 | Morgan | B60G 17/0165 |
| 2022/0032707 | A1* | 2/2022 | Yoshida | B60G 17/017 |
| 2023/0043104 | A1* | 2/2023 | Abdallah | B60G 17/0525 |
| 2023/0260288 | A1* | 8/2023 | Young | G06V 20/56 382/104 |
| 2023/0394353 | A1* | 12/2023 | Beaurepaire | G08G 1/0129 |
| 2024/0037444 | A1* | 2/2024 | Beaurepaire | G06N 20/00 |

FOREIGN PATENT DOCUMENTS

| | | |
|---|---|---|
| DE | 102019208812 A1 | 12/2020 |
| EP | 3156270 A1 | 4/2017 |
| GB | 2552661 A | 2/2018 |
| JP | 2016179771 A | 10/2016 |
| JP | 2017094970 A | 6/2017 |

OTHER PUBLICATIONS

Combined Search and Examination Report for Application No. GB2018683.9, dated Aug. 9, 2021, 7 pages.

Office Action in related European Application No. 21823212.2, mailed Jul. 24, 2025 (7 pages).

* cited by examiner

VEHICLE RAMP ANGLE CONTROL

TECHNICAL FIELD

The present disclosure relates to vehicle ramp angle control. In particular, but not exclusively it relates to vehicle ramp angle control using an active suspension system.

BACKGROUND

An approach angle is the maximum angle of a ramp onto which a vehicle can climb longitudinally from a first plane (e.g. horizontal plane) onto a second longitudinally inclined plane without contact between the vehicle body and the ground.

Approach angle is defined as an angle between the first plane and a line drawn between the tangent of the front tyre and the lowest-hanging part of the vehicle body at the front overhang. The lowest-hanging part is typically the lowest edge of a bumper, a front splitter, a front fascia or a skid plate.

Departure angle is the counterpart of approach angle at the rear of the vehicle, indicating the maximum ramp angle from which the vehicle can descend without the vehicle body contacting the ground.

Breakover angle is the maximum angle that a vehicle, with at least one forward wheel and one rear wheel, can drive over without the apex of that angle touching any point of the vehicle other than the wheels.

The approach and departure angles of most vehicles tend to be different, with the lower of the two often limiting the capability of the vehicle on certain obstacles.

Approach and departure angles are referred to collectively as vehicle ramp angles.

A common obstruction while driving off-road is a ramp-type obstacle having an actual ramp angle greater than a vehicle ramp angle. The ramp-type obstacle could be a sloping surface or a staircase-like surface, for example.

Outside an off-road environment, steep ramps can also be encountered when tackling driveways, speed-bumps or vehicle transporter ramps.

SUMMARY OF THE INVENTION

It is an aim of the present invention to address one or more of the disadvantages associated with the prior art.

According to an aspect of the invention there is provided a control system for controlling an active suspension system of a vehicle, the control system comprising one or more controller, wherein the control system is configured to: detect a ramp approached by an overhang of the vehicle; and
in dependence on detecting the ramp, control the active suspension system to modify a relative ride height between a leading ride height at a set of leading wheels of the vehicle and a trailing ride height at a set of trailing wheels of the vehicle, to increase a ramp angle of the vehicle relative to the ramp.

In some examples, controlling the active suspension system comprises at least one of: raising the leading ride height; and lowering the trailing ride height.

In some examples, the control system is configured to: determine that the vehicle is within a predetermined proximity of the ramp; and enable the control of the active suspension system to increase the ramp angle of the vehicle at a leading overhang of the vehicle relative to the ramp in dependence on the vehicle being within the predetermined proximity.

In some examples, the control system is configured to: determine that the set of leading wheels has mounted the ramp; and control the active suspension system to increase a ramp angle of the vehicle at a trailing overhang of the vehicle relative to the ramp, wherein controlling the active suspension system comprises at least one of: raising the trailing ride height; and lowering the leading ride height.

In some examples, determining that the set of leading wheels has mounted the ramp is dependent on data from at least one of: an acceleration sensor, e.g. indicating acceleration in a vertical axis; a speed sensor, e.g. indicating distance travelled; and an imaging sensor, e.g. indicating distance travelled.

In some examples, the control system is configured to determine whether a ramp angle condition is satisfied, comprising: determining a parameter indicative of an angle of the ramp; and determining whether the parameter exceeds a limit, wherein the ramp angle is increased in dependence on the parameter exceeding the limit.

In some examples, if the parameter exceeds an upper threshold, the ramp angle is not increased and/or a warning signal is generated in dependence on the parameter exceeding the upper threshold.

In some examples, determining whether the ramp angle condition is satisfied comprises at least one of: determining whether the parameter exceeds an approach angle limit associated with an approach angle of the vehicle; and determining whether the parameter exceeds a departure angle limit associated with a departure angle of the vehicle, wherein the ramp angle is increased in dependence on the parameter exceeding at least one of the approach angle limit and departure angle limit.

In some examples, the departure angle limit is different from the approach angle limit.

In some examples, the control system is configured to determine the approach angle limit and the departure angle limit in dependence on at least one of: a ride height of the vehicle; a current prevailing roll angle of the vehicle; and a current prevailing pitch angle of the vehicle. Additionally or alternatively, the control system is configured to determine the approach angle limit and the departure angle limit in dependence on at least one of an angular rate associated with vehicle roll and/or vehicle pitch.

In some examples, the control system is configured to determine intended vehicle movement, wherein the ramp angle of the vehicle is increased in dependence on the determination of intended vehicle movement and detection of the ramp in a path of the intended movement of the vehicle, wherein the determination of intended vehicle movement is dependent on one or more of: a torque request being greater than a threshold; a vehicle braking parameter being less than a threshold; a vehicle speed request parameter being greater than a threshold; and an indication that a torque source of the vehicle is coupled to a set of drive wheels of the vehicle.

In some examples, detecting the ramp is dependent on information from a topography detection sensor.

In some examples, the control system is configured to determine whether the vehicle is in a forward gear or a reverse gear, wherein if the vehicle is in a forward gear, detecting the ramp is dependent on a forward-facing sensor, and wherein if the vehicle is in a reverse gear, detecting the ramp is dependent on a rearward-facing sensor.

In some examples, the control system is configured to determine whether the vehicle is in a towing condition, wherein if the vehicle is in a towing condition the ramp angle is not increased and optionally, a warning signal generated in dependence on the vehicle being in a towing condition.

In some examples, the control system is configured to determine whether the vehicle is in a first terrain mode or a second terrain mode, wherein if the vehicle is in the first terrain mode the ramp angle is not increased, and wherein if the vehicle is in the second terrain mode the ramp angle is increased, wherein in the first and second terrain modes one or more vehicle subsystems are controlled according to different sets of configurations.

According to a further aspect of the invention there is provided a control system for controlling an active suspension system of a vehicle, the control system comprising one or more controller, wherein the control system is configured to: determine a ramp angle modification request; determine a selected front or rear overhang of the vehicle; and in dependence on the determinations, transmit a force request to the active suspension system to cause an increase of a ramp angle of the vehicle at the selected front or rear overhang of the vehicle.

According to a further aspect of the invention there is provided an active suspension system comprising the control system.

According to a further aspect of the invention there is provided a vehicle comprising the control system or the active suspension system.

According to a further aspect of the invention there is provided a method of controlling an active suspension system of a vehicle, the method comprising: detecting a ramp approached by an overhang of the vehicle; and in dependence on detecting the ramp, controlling the active suspension system to modify a relative ride height between a leading ride height at a set of leading wheels of the vehicle and a trailing ride height at a set of trailing wheels of the vehicle, to increase a ramp angle of the vehicle relative to the ramp.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
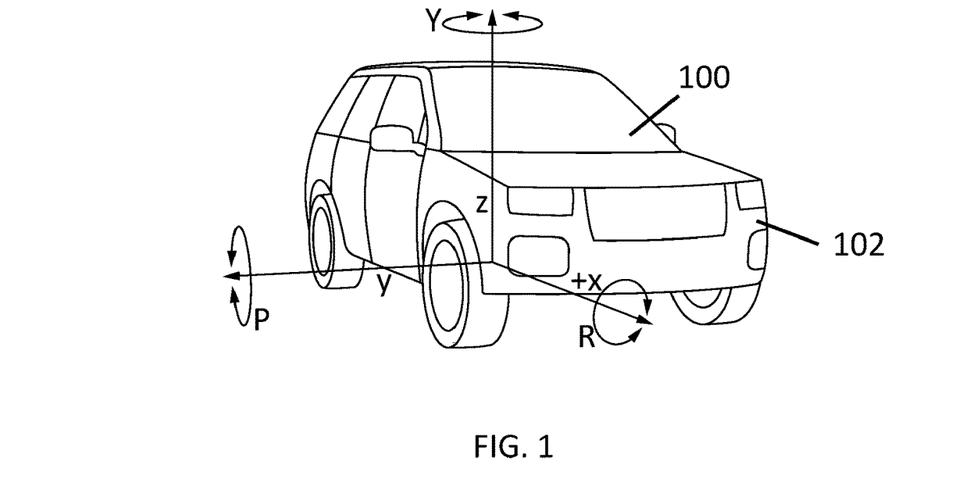
FIG. 1 illustrates an example vehicle and a coordinate system.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

In the examples described herein, the vehicle 100 is assumed to be travelling forward (+x) such that front wheels of the vehicle 100 are leading wheels, and rear wheels are trailing wheels. If the vehicle 100 is travelling in reverse, the rear wheels would be leading wheels and the front wheels would be trailing wheels.

Figure 2:
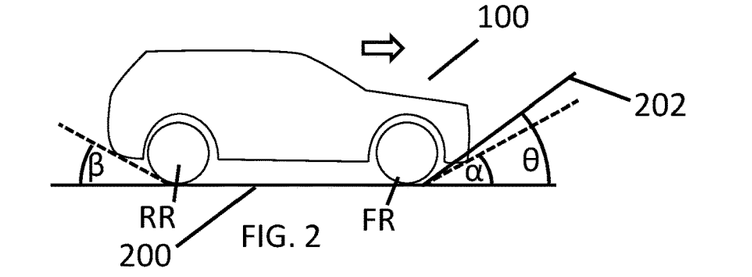
FIG. 2 illustrates an example vehicle with an insufficient approach angle for climbing a ramp.

FIG. 2 illustrates a vehicle 100 driving forwards on a horizontal approach plane 200 towards an inclined ramp plane 202. FIG. 2 is a side view from the right side of the vehicle so that front right FR and rear right RR wheels are shown.

The ramp 202 defines an actual ramp angle $\theta$ relative to an approach plane 200 (e.g. horizontal horizon), which can be regarded as a required ramp angle of the vehicle 100. The vehicle ramp angles include an approach angle $\alpha$ and a departure angle $\beta$. The minimum vehicle ramp angle for avoiding body-to-ground contact is the lower of $\alpha$ and $\beta$.

For an off-road-capable vehicle 100, the approach angle $\alpha$ can be within the range 25 to 50 degrees and the departure angle $\beta$ can be within the range 25 to 50 degrees.

In the illustrated example, the approach angle $\alpha$ is lower than $\theta$ and is therefore insufficient for avoiding body-to-ground contact.

Figures 3, 4:
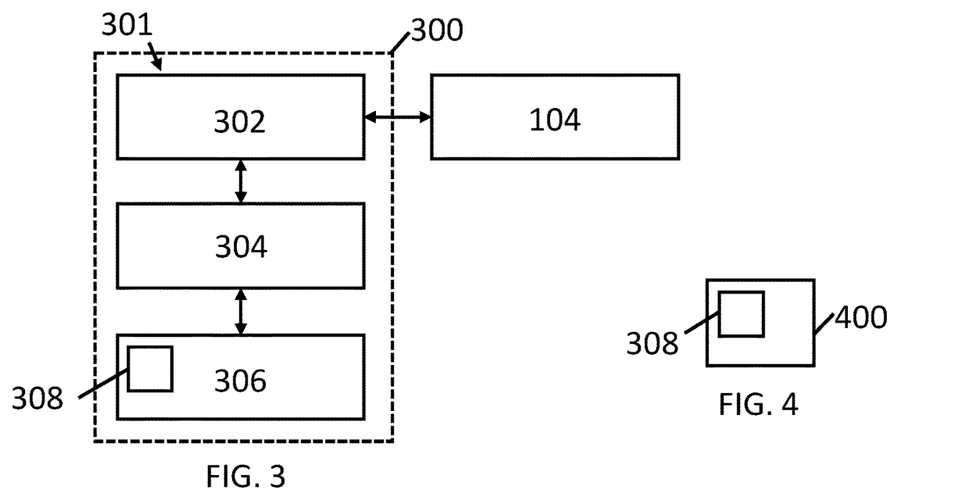
FIG. 3 illustrates an example control system.
FIG. 4 illustrates an example of a non-transitory computer-readable storage medium.

In embodiments of the present invention, the suspension of the vehicle 100 is an active suspension system 104 that can be controlled by a control system 300 such as the one shown in FIG. 3. The active suspension system 104 is capable of changing a wheel-to-body distance at the front wheel FR and/or independently at the rear wheel RR. Therefore, the active suspension system 104 can change the vehicle ramp angles.

An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software).

Figure 5:
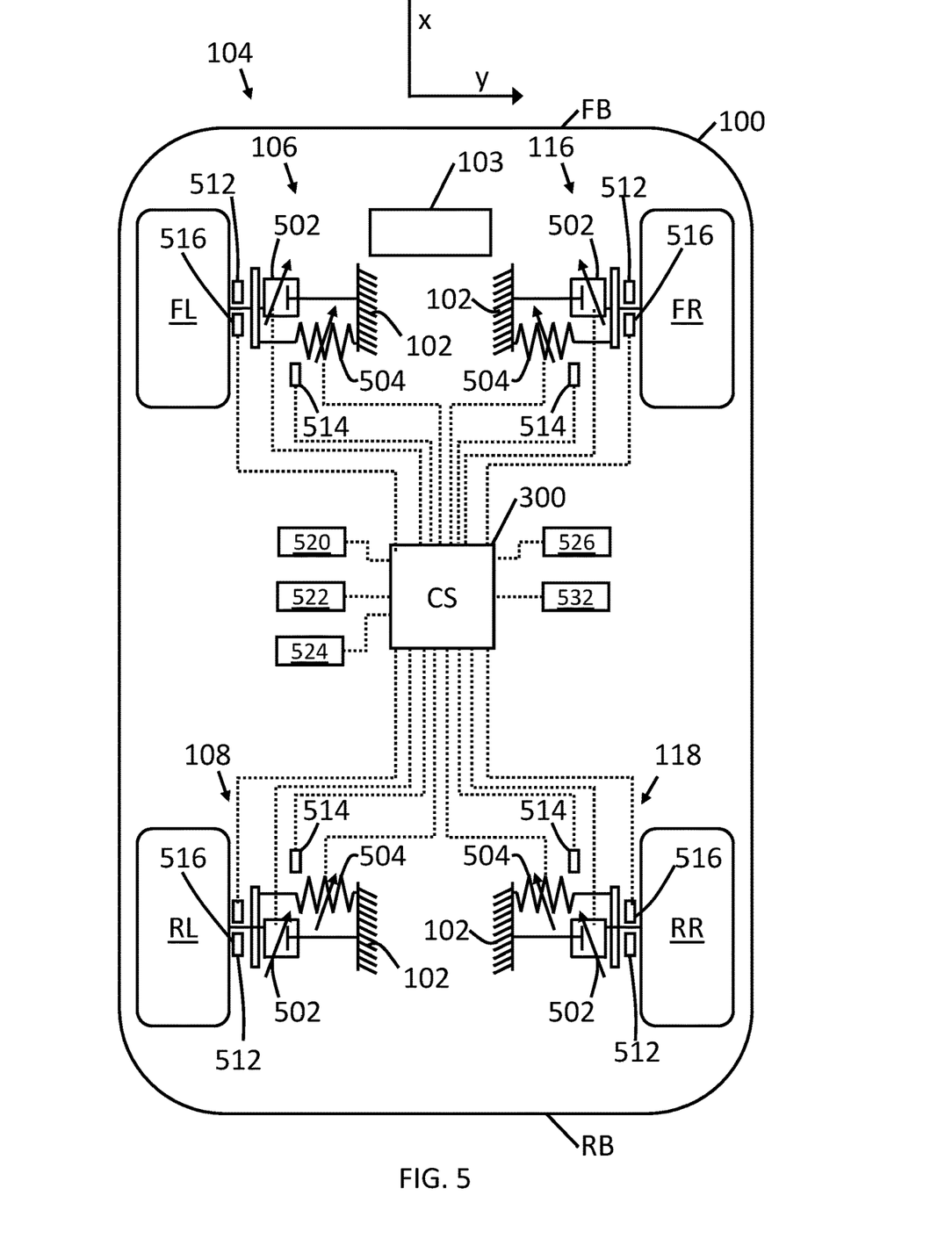
FIG. 5 illustrates an example of an active suspension system of a vehicle.

FIG. 5 illustrates an example implementation of the active suspension system 104.

The active suspension system 104 comprises front left active suspension 106 for a front left wheel FL, front right active suspension 116 for a front right wheel FR, rear left active suspension 108 for a rear left wheel RL, and rear right active suspension 118 for a rear right wheel RR. The active suspension for each wheel (e.g. quarter/corner) of the vehicle 100 may be individually controllable.

FIG. 5 also shows a torque source 103 such as an internal combustion engine or electric machine, for driving at least some of the vehicle wheels.

FIG. 5 also shows a front bumper FB and a rear bumper RB. The front overhang of the vehicle 100 is the x-axis length from the front wheel FL, FR to the front bumper FB, and affects the approach angle. The rear overhang of the vehicle 100 is the x-axis length from the rear wheel RL, RR to the rear bumper RB, and affects the departure angle. The terms 'approach' and 'departure' in this disclosure therefore refer to ramp angles at specific ends of the vehicle 100, regardless of the direction of the vehicle 100. That is, if the vehicle 100 climbs a ramp backwards in a reverse gear, the rear overhang is 'leading' and the departure angle of the vehicle 100 will reach the ramp 202 first, before the approach angle of the vehicle 100.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force of a coil spring against displacement. Dynamic control enables the force-displacement relationship to be changed to adapt to a driving scenario. Energy can be added or removed quickly, e.g. e.g. within tens of milliseconds. In order to control spring force, the control system 300 may output a force demand that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 in order to extend or retract the actuator 502. In FIG. 5 this enables the wheel-to-body distance to be changed independently at different ends and/or at different corners of the vehicle 100, to enable the vehicle ramp angles to be changed.

The above example refers to a hydraulic actuator 502, and in other embodiments the actuator may be an electromagnetic actuator or a pneumatic actuator, or the like.

In FIG. 5, but not necessarily all examples, the spring 504 comprises an active spring such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy in the form of fluid such as air can be added to or removed from the pneumatic spring 504 in order to increase or decrease the volume of the pneumatic spring 504. Increasing the volume can lift the vehicle body 102 in the z-axis. In FIG. 5 this enables the wheel-to-body distance to be changed independently at different ends and/or at different corners of the vehicle 100, to enable the vehicle ramp angles to be changed.

Therefore, either one or both of the actuator 502 and the active spring 504 can be controlled to change the vehicle ramp angles.

Additionally or alternatively, the spring 504 comprises a passive spring (e.g. coil) or is omitted entirely.

Control of the active suspension system 104 relies on one or more sensors. Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from wheel hub accelerometers.

Pressure in the pneumatic spring 504 can be sensed to indicate weight onto the wheel.

In at least some examples the control system 300 is configured to control the active suspension system 104 by transmitting a force request to the active suspension or to a low-level controller thereof. The force request may be an arbitrated force request based on requests from various requestors and information from various sensors.

In the present disclosure, the force request can at least control vehicle pitch. In some examples the force request can also control vehicle roll.

FIG. 5 illustrates additional optional features that may interact with the control system 300 to influence force demand calculation. These include any one or more of:

- A wheel speed sensor 512 for each wheel. In an example implementation, the wheel speed sensor 512 is part of an antilock braking system (ABS).
- A hub-mounted accelerometer 516 for each wheel, coupled to the unsprung mass of the vehicle 100. Like the wheel-to-body displacement sensor 514, a hub-mounted accelerometer 516 can also be regarded as a suspension displacement-based sensor because hub acceleration in the z-axis (wheel travel arc) is dependent on a rate of change of suspension displacement.
- A human-machine interface (HMI) 520. This refers to any of the various input devices and input/output devices available to the driver such as touchscreens, displays, hardware switches/sliders/selectors or the like. An output device such as a display or speaker could render information, alerts and warning signals relating to the methods described herein.
- At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.
- A tyre pressure monitoring system (TPMS) 524 comprising tyre pressure monitors for each wheel.
- At least one topography detection sensor 526 configured to detect a surface topography around the vehicle 100. Examples include imaging sensors. Imaging sensors include cameras, lidar sensors, radar sensors, ultrasonic sensors combined with other sensors or the like, or a combination thereof. Cameras, lidar and radar sensors provide an image indicative of topography that can be converted to a 3D point cloud or discretized in some other way. The sensors may be located around the vehicle 100 each having different fields of view. The fields of view include a forward view in the +x-axis. If the methods herein are operable in a reverse gear, the fields of view may include a rear view in the −x-axis.
- A driveline torque sensor 532 configured to detect positive and negative torque between the torque source 103 and one or more wheels.

FIGS. 6A, 6B, 7A, 7B illustrate examples of controlling the active suspension system 104 to help the vehicle traverse the ramp 202 of FIG. 2 in different directions. In these examples the vehicle 100 is driving forwards, but the same concepts apply if the vehicle 100 is in reverse.

In each example, the active suspension system 104 is being controlled to modify a relative ride height between a leading ride height at a set of leading wheels of the vehicle 100 and a trailing ride height at a set of trailing wheels of the vehicle 100, to increase one of the vehicle ramp angles relative to the actual ramp angle.

Figure 6A:
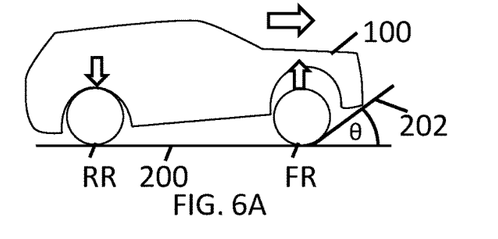
FIGS. 6A, 6B illustrate an example of a vehicle ascending a ramp.

In FIG. 6A the front overhang is approaching an up-ramp 202, so increasing the vehicle ramp angle comprises increasing the approach angle. In FIG. 6A the leading ride height is increased as shown by the upwards arrow at the leading wheel FR, and the trailing ride height is concurrently decreased as shown by the downwards arrow at the trailing wheel RR.

This demonstrates the ability to cooperatively "share" the vehicle ramp angle between approach and departure to improve the ramp capability of the vehicle 100. Using this method for sharing the angle between approach and departure, vehicle ramp capability can be increased at the end of the vehicle 100 where clearance is needed most. In FIG. 6A more approach angle is needed whereas departure angle is not important, so the vehicle pitch changes to add some approach angle at the expense of sacrificing some departure angle.

Figure 6B:
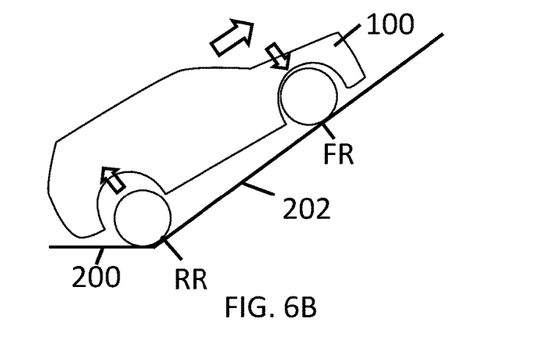

In FIG. 6B the front wheels FL, FR have mounted the up-ramp 202 but the rear wheels RL, RR and rear overhang are still approaching the up-ramp 202. In this situation, increasing the vehicle ramp angle comprises increasing the departure angle to prevent collision of the rear overhang with the approach plane 200. In FIG. 6B the leading ride height is decreased as shown by the downwards arrow at the leading wheel FR, and the trailing ride height is concurrently increased as shown by the upwards arrow at the trailing wheel RR.

In one embodiment, both of FIGS. 6A and 6B are performed consecutively, for example if both the approach and departure angles are less than the actual ramp angle α. In another embodiment, just one of FIGS. 6A and 6B is performed, for example if only the approach angle or only the departure angle is less than the actual ramp angle θ.

Figure 7A:
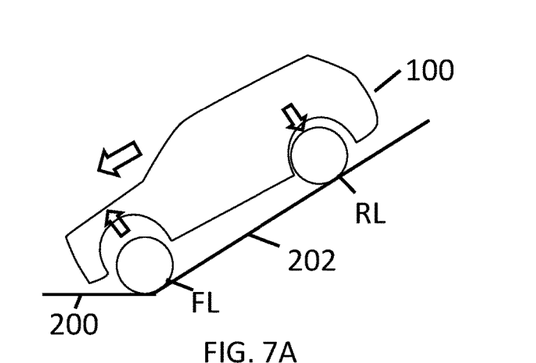
FIGS. 7A, 7B illustrate an example of a vehicle descending from a ramp.

In FIG. 7A the vehicle 100 is descending from a down-ramp 202 onto level ground 200, as seen by an observer on a horizontal plane. Of course, from the vehicle's perspective the vehicle 100 is heading towards an up-ramp relative to the plane currently occupied by the vehicle 100. The front overhang is approaching the end of the down-ramp 202, so increasing the vehicle ramp angle comprises increasing the approach angle. In FIG. 7A the leading ride height is increased as shown by the upwards arrow at the leading wheel FL, and the trailing ride height is decreased as shown by the downwards arrow at the trailing wheel RL.

Figure 7B:
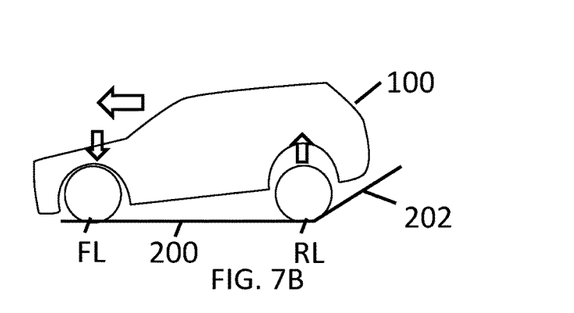

In FIG. 7B the front wheels FL, FR have passed the end of the down-ramp 202 but the rear wheels RL, RR and rear overhang are still approaching the end of the down-ramp 202. In this situation, increasing the vehicle ramp angle comprises increasing the departure angle. In FIG. 7B the leading ride height is decreased as shown by the downwards arrow at the leading wheel FL, and the trailing ride height is increased as shown by the upwards arrow at the trailing wheel RL.

In one embodiment, both of FIGS. 7A and 7B are performed consecutively, for example if both the approach and departure angles are less than the actual ramp angle. The control system 300 can measure a first gap between the lowest-hanging part of the front of the vehicle 100 and the ground from sensor (e.g. ultrasonic/radar/lidar) data, and can measure a second gap between the lowest-hanging part of the rear of the vehicle 100 and the ground, and can control the active suspension system 104 to reduce/minimise the difference between the second gap and the first gap to keep them approximately equal. In another embodiment, just one of FIGS. 7A and 7B is performed, for example if only the approach angle or only the departure angle is less than the actual ramp angle.

In an example implementation, increasing ride height comprises extending the actuators 502 (and/or springs 504) of the front suspension 106, 116 for increasing front ride height, or of the rear suspension 108, 118 for increasing rear ride height. Decreasing the ride height may comprise retracting the actuators 502 of the front suspension 106, 116 for decreasing front ride height, or of the rear suspension 108, 118 for decreasing rear ride height. It should be noted that whether retraction or extension is required depends on the type of linkage between the actuator 502 and the wheel.

As mentioned above, FIGS. 6A, 6B, 7A, 7B show that one ride height is increased while the other is decreased to change the pitch of the vehicle 100, resulting in an increased vehicle ramp angle at the upwardly-pitched end of the vehicle 100 closest to the ramp 202. The other end of the vehicle 100 furthest from the ramp 202 is downwardly pitched so has a reduced ramp angle.

In one embodiment, the ride height at one end of the vehicle 100 starts increasing at the same time as the ride height at the other end starts decreasing. In other embodiments, the decrease may start after the increase or vice versa, but there is some overlap in time in which one end has decreased ride height and the other end has increased ride height.

Increasing one ride height while decreasing the other provides the greatest vehicle pitch change. In a second embodiment the leading ride height is increased without decreasing the trailing ride height. In a third embodiment the trailing ride height is decreased without increasing the leading ride height.

Figure 8:
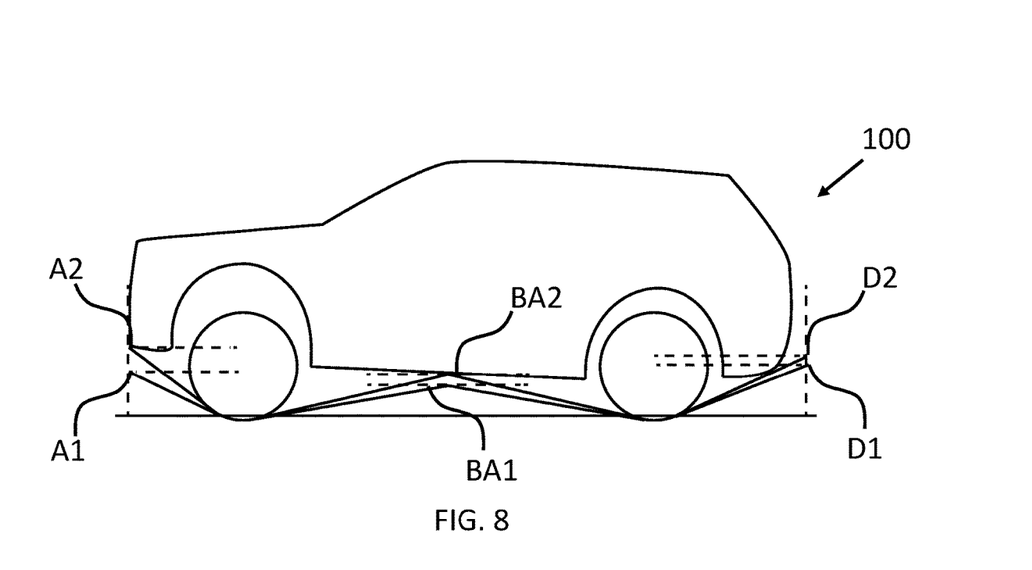
FIG. 8 illustrates an example relationship between ramp angle and active suspension position.

FIG. 8 illustrates a possible range of variability of vehicle ramp angles by controlling the active suspension system 104. The approach angle can be raised from A1 to A2 by raising the front suspension and/or lowering the rear suspension. The departure angle can be raised from D1 to D2 by raising the rear suspension and/or lowering the front suspension. A breakover angle can be raised from BA1 to BA2 by raising the rear suspension and/or raising the front suspension.

The initial vehicle ramp angles A1 and D1 depend on factors such as the overall vehicle ride height, the vehicle rake angle, the front and rear overhang lengths, and the vehicle roll angle. Regarding roll angle, if the vehicle 100 is rolled leftwards, the ramp angles at the left wheels FL, RL will be smaller than the ramp angles at the right wheels FR, RR.

In the example vehicle 100 of FIG. 8 but not necessarily all vehicles the initial approach angle A1 is similar to but slightly greater than the initial departure angle D1. This is due to the shorter front overhang than rear overhang.

Figure 9A:
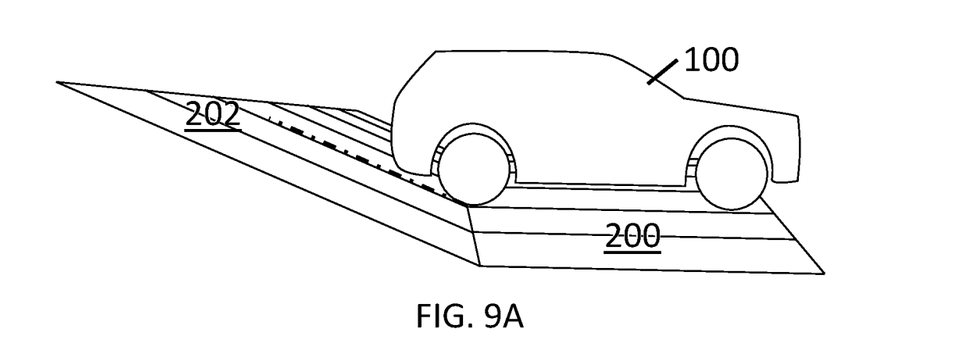
FIGS. 9A, 9B, 9C are photographs of a vehicle raising its departure angle.
Figure 9B:
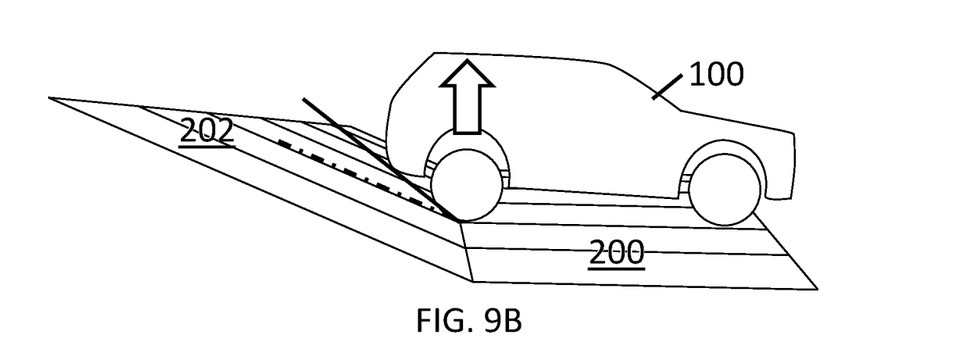
Figure 9C:
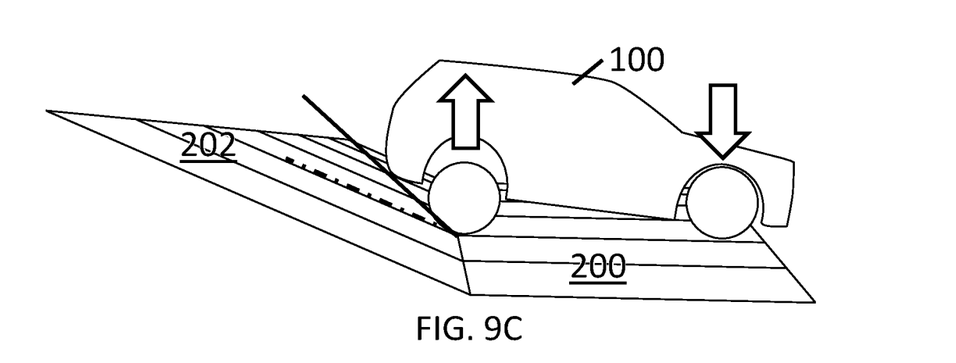

FIGS. 9A to 9C photographically illustrate the result of an experiment corresponding to the scenario of FIG. 7B. The chain dashed line indicates the actual ramp angle.

In FIG. 9A, the rear overhang of the vehicle 100 is in contact or near-contact with the ground.

In FIG. 9B, the rear ride height is raised but the front ride height is unchanged. The solid line indicates the departure angle which is now greater than the actual ramp angle, so the vehicle 100 can avoid ground contact.

In FIG. 9C, the front ride height is lowered while the rear ride height remains the same as in FIG. 9B. The result is a further increase of the departure angle.

In some, but not necessarily all examples, the breakover angle can be increased when the control system 300 detects a crest, for example when the control system 300 determines that the vehicle 100 is cresting the top of a ramp.

Figure 10:
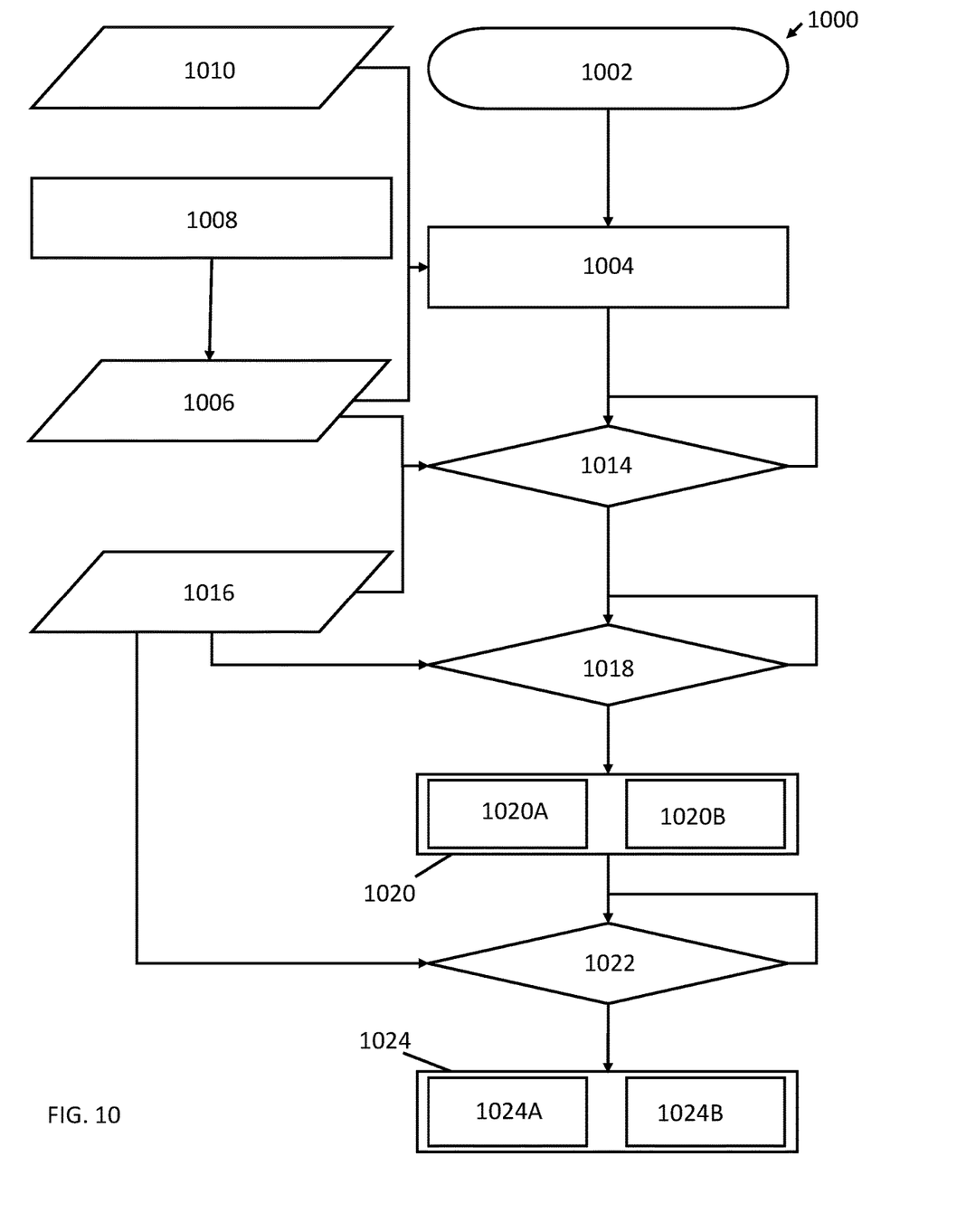
FIG. 10 illustrates an example method.

FIG. 10 illustrates an example control method 1000 for increasing vehicle ramp angles. The method 1000 may be implemented by the control system 300.

The method 1000 starts at operation 1002 in which the method is enabled.

Enabling the method 1000 may optionally require that one or more inhibit conditions are not active. Examples are provided below.

A first example inhibit condition is that the vehicle 100 is not towing. This is because stability and hitch durability can be sensitive to vertical articulation and because trailers can have worse departure angles than vehicles. The method 1000 comprises determining whether the vehicle 100 is in a towing condition, wherein if the vehicle 100 is in a towing condition the method 1000 does not proceed.

A towing condition can be detected in various ways. One example is detecting an electrical towing socket connection. Another example is detecting a mechanical connection to a tow hook. Another example is determining whether a towing mode is selected in an HMI 520 (e.g. mode selector). Another example is image recognition of a towed object from a rear-facing camera. Other methods of determining whether the vehicle is towing are useful.

A second example inhibit condition is that the vehicle 100 is not in a permissible terrain mode, for implementations in which the method 1000 is only used off-road or is not used on certain kinds of driving surfaces. Terrain modes are defined towards the end of this specification.

The method 1000 may determine whether the vehicle 100 is in a first terrain mode or a second terrain mode. If the vehicle 100 is in a first terrain mode the method 1000 does not proceed. If the vehicle 100 is in a second terrain mode the method 1000 proceeds.

In an embodiment the first terrain mode is an on-road mode and the second terrain mode is an off-road mode.

A third example inhibit condition is that an angle of the vehicle body 102 exceeds limits. The method 1000 could check one or both of pitch angle and roll angle. If the angle is outside the limits, the method 1000 does not proceed.

Further example inhibit conditions include: suspension fault codes; excessive steering angle; vehicle doors ajar; vehicle speed above a threshold; etc.

In some examples, the control system 300 can temporarily limit vehicle speed such as by lowering a speed setpoint or by changing an acceleration map, until the ramp has been passed.

If the method 1000 is for automatically changing the vehicle ramp angle but an inhibit condition is satisfied, a warning signal can be optionally generated via an HMI 520, of any appropriate form that alerts the driver not to expect the vehicle ramp angle to increase automatically.

The method 1000 can either be enabled automatically as long as inhibit conditions are not satisfied, or can be activated manually via an HMI 520 or a manual mode/terrain mode selection as long as inhibit conditions are not satisfied.

Assuming the method 1000 is enabled, the method 1000 proceeds to operation 1004 comprising detecting a ramp 202 approached by an overhang of the vehicle 100. This applies to one or more or any of the scenarios of FIGS. 6A, 6B, 7A, 7B.

The ramp detection process should be pre-emptive, before the affected wheel has made contact with the ramp 202. This ensures that vehicle ramp angles can be changed before body-to-ground contact.

In an example, the ramp detection is based on pre-emptive sensor data from data block 1006. The data may comprise information from a pre-emptive sensor such as a topography detection sensor 526 as mentioned earlier. A 3D point cloud is an example of suitable data.

Operation 1008 may select the relevant pre-emptive sensor for the data block 1006 based on whether the vehicle 100 is driving in forward or reverse. A forward-facing sensor can be used if the vehicle 100 is in a forward gear or is otherwise detected to be moving forward (e.g. sensor image processing, acceleration). A rearward-facing sensor can be used if the vehicle 100 is in a reverse gear or is otherwise detected to be moving in reverse.

A path projection algorithm may detect ramps with reference to expected or intended paths of the left and right wheels.

In an example embodiment, detection of the ramp 202 at operation 1004 may utilize a collision detection algorithm.

In one example, the collision detection algorithm could convert the topography information to surfaces such as a mesh. The positions of the lowest-hanging parts of the vehicle body overhangs are modelled in 3D space, representing an approach angle limit and a departure angle limit. Collision with the 3D topography surface indicates body-to-surface contact.

A margin of error could be employed, so that a predicted collision may correspond in real life to a near-collision.

In another example, the collision detection algorithm could mathematically transform the topography information into a format that can be directly compared with angular units representing the approach angle limit and the departure angle limit of the vehicle 100.

In another example, if the method 1000 is only applied to specific types of ramps, a predetermined ramp-mask or set of ramp characteristics could be provided to look for features/objects conforming to said characteristics. Ramp variables can then be compared to the approach angle limit and the departure angle limit of the vehicle 100.

The approach angle limit and departure angle limit (ramp angle limits) could be supplied from data block 1010. These ramp angle limits could be variables depending on at least one of: ride height; current prevailing roll angle; an angular rate associated with vehicle roll angle; current prevailing vehicle pitch angle; and an angular rate associated with vehicle pitch angle. These depend on vehicle weight loading and/or a set ride height. The approach angle limit can therefore differ from the departure angle limit (see FIG. 8). The ramp angle limits could further be specific to each corner of the vehicle 100, or each lateral side. The ramp angle limits could be calculated based on information from one or more of: the sensors 514, 516, 522; pneumatic spring pressure; tyre pressure from TPMS 524; or more. For example, if the user had lowered the tyre pressure then the available ramp angle and the ride height will drop slightly with a lower tyre pressure.

The method 1000 could determine whether increasing the vehicle ramp angle would prevent body-to-ground contact. If so, the location at which the vehicle ramp angle needs to have changed to prevent said contact could correspond to the putative start location of the ramp 202.

If the method 1000 will fail to prevent body-to-ground contact, the method 1000 may not be employed for that ramp 202. In other words, the actual ramp angle exceeds an upper threshold, the upper threshold corresponding to the modified vehicle ramp angles A2, D2 of FIG. 8. Alternatively, the driver may be given the choice to override the system via an HMI 520, making a manual selection to cause the ramp angle to adjust as far as is possible. This may be useful where the vehicle 100 is detecting the top of the obstacle, but cannot account for that top edge being deformable (grass, snow, soft mud etc.), where contact with the vehicle 100 is unlikely to cause damage.

In some, but not necessarily all examples, if the vehicle 100 comprises an electrically deployable tow hitch, and if the tow hitch is deployed and the vehicle 100 is not towing, the control system 300 may render a notification to the user that the user should pause and allow the tow hitch time to retract. Tow hitch retraction can be user-initiated or automatically initiated based on the ramp detection.

In summary, the present method 1000 is used if a lower threshold associated with angles A1, D1 of FIG. 8 is exceeded, as long as the modified angles A2, D2 are sufficient to avoid body-to-ground contact.

If the method 1000 will fail to prevent body-to-ground contact, a warning signal could be generated similar to the one described earlier.

Regardless of which of the above types of image processing are employed, the method 1000 effectively determines whether a ramp angle condition is satisfied. A parameter (e.g. 3D topography surface, ramp variable) indicative of the angle of the ramp 202 is compared to a limit (e.g. vehicle ramp angle limits). If the limit is exceeded, the ramp angle condition is satisfied.

Once the ramp 202 has been detected, the method 1000 proceeds to optional operations 1014 and 1018. Operations 1014 and 1018 define conditions for a trigger for enabling initiation of the change of vehicle ramp angle. If both operations 1014 and 1018 are performed, the trigger may require satisfaction of both conditions.

Operation 1014 comprises determining whether the vehicle 100 is within a predetermined proximity of the ramp 202. If the vehicle 100 is within the predetermined proximity the ramp angle control can be enabled. If the vehicle 100 has not yet reached the predetermined proximity the ramp angle control is not enabled.

The predetermined proximity could be expressed as an upstream distance or as an upstream time (distance/speed) for a vehicle reference point to reach a ramp reference point. The vehicle reference point could be the location of the vehicle 100 or the location of a specific portion of the vehicle 100.

The method 1000 can evaluate proximity to the ramp 202 using data from pre-emptive sensor data block 1006 such as data from the topography detection sensor 526 indicating proximity to the ramp 202. Additionally or alternatively, the method 1000 can evaluate proximity to the ramp 202 using data from reactive sensor data block 1016 such as vehicle speed data, wheel speed data, vehicle body accelerometer data or the like.

If the ride height of the leading overhang needs to be raised (e.g. FIG. 6A, 7A), then the predetermined proximity may be configured so that the vehicle ramp angle is increased before the leading wheels of the vehicle 100 have mounted the ramp 202.

If the ride height of the trailing overhang needs to be raised (e.g. FIG. 6B, 7B), the predetermined proximity may be configured so that the vehicle ramp angle is increased after the leading wheels of the vehicle 100 have mounted the ramp 202 but before the trailing wheels of the vehicle 100 have mounted the ramp 202. This wait is useful because raising the ride height of the trailing overhang will sacrifice some ride height at the leading overhang so it would be best to first ensure that the leading overhang has sufficient clearance (has mounted the ramp).

Checking that the leading wheel has mounted the ramp can be performed most accurately using reactive sensor data from the wheel hub accelerometer 516 (and/or sensor 514) at the leading wheels, which detect the disturbance to the leading wheel suspension caused by mounting the ramp 202. When a rate of change of acceleration is then below a threshold, the waiting may complete. Another example is based on distance travelled—once the leading wheels are at least a few centimetres on the slope the trailing wheel angle can be raised.

The precise distance associated with the predetermined proximity condition 1014 depends on implementation. The precise location may be a sufficient distance/time ahead of the ramp 202 that the vehicle 100 may not have to stop moving to wait for the active suspension system 104 to finish adjusting to the new vehicle ramp angle. The proximity may be speed dependent, to trigger earlier if the vehicle 100 is moving faster.

The other trigger condition of operation 1018 relates to intended vehicle movement, assuming the driver is longitudinally controlling the vehicle 100 (acceleration and braking). If the driver stops short of the ramp 202 and does not intend to ascend the ramp 202, then the vehicle 100 should not be held at the modified pitch angle indefinitely.

Determining that the driver intends to move the vehicle 100 can rely on data from reactive sensor data block 1016, such as one or more of:
- a detected torque request being greater than a threshold. The threshold may be set to distinguish between a situation in which the driver may be stopping or parking the vehicle 100 ahead of the ramp 202 (e.g. zeroNery low accelerator pedal torque request), and a situation in which the driver may be preparing to ascend the ramp 202 (e.g. increasing accelerator pedal torque request).
- a detected vehicle braking parameter being less than a threshold. The threshold may be set to distinguish between a situation in which the driver may be stopping/parking the vehicle 100 ahead of the ramp 202 (e.g. an increasing brake force request), and a situation in which the driver may be preparing to ascend the ramp 202 (e.g. a reducing or zero brake force request).
- a vehicle speed request parameter being greater than a threshold. This is relevant for example if longitudinal control of the vehicle 100 is autonomous. The control system 300 may be controlling vehicle speed towards a target speed that may be driver-set or autonomously set.
- an indication that the torque source is coupled to a set of drive wheels of the vehicle 100. In other words, the vehicle 100 is in-gear. If the vehicle 100 is taken out-of-gear, the method 1000 may be inhibited. If the vehicle 100 is all-wheel drive, it may be sufficient that only a subset of wheels is coupled to the torque source, or it may be necessary for all wheels to be coupled to the torque source.

When the trigger condition(s) is/are satisfied, enabling initiation of the change of ramp angle may comprise automatically initiating the change of ramp angle with an optional driver HMI alert prior to initiation, or may comprise allowing/prompting a driver to manually initiate the change of ramp angle via an HMI 520.

When any one of the trigger conditions is not satisfied, the trigger condition may loop until it is satisfied and can proceed.

At operation 1020, the vehicle ramp angle at the leading overhang is increased if required. Sub-routine 1020A raises the ride height at the leading wheels. Sub-routine 102013 lowers the ride height at the trailing wheels. Examples are described earlier with references to FIGS. 6A, 7A.

The adjustments of ride heights may be less than maximum possible adjustments, to provide some suspension compliance and reserve capacity. The adjustments could be performed with a velocity limit, acceleration limit or jerk limit to avoid a sudden or jerky motion.

As shown in the Figures, increasing the vehicle ramp angle at the leading overhang results in a sacrifice of vehicle ramp angle at the trailing overhang. In some examples, the method 1000 may monitor for an indication of unintended ground contact at the trailing overhang of the vehicle 100 during operation 1020. If ground contact occurs, the vehicle ramp angle at the trailing overhang may be increased by raising the trailing ride height and/or lowering leading ride height. Various sensors enable monitoring for an indication of ground contact. One example is a suspension displacement sensor 514/516.

In some, but not necessarily all examples, if there is a possibility of a collision at only one of the lateral left and right sides of the vehicle, the vehicle ramp angle may be nonetheless be increased at both left and right sides. In another embodiment, operation 1004 could distinguish between left and right sides. If there is a possibility of a collision on the left side only, then the vehicle ramp angle may be increased at only the left side. If the collision is to the right side, the vehicle ramp angle may be increased only at the right side.

In some, but not necessarily all examples the method 1000 may compensate for a roll angle of the vehicle 100. The roll angle could be due to the ramp 202 having a side-slope or due to mounting the ramp 202 from a non-perpendicular angle. This makes one of the left and right lateral corners of the overhang more likely to contact the ground than the other. The ride height may be increased for the corner that is more likely to contact the ground. The ride height at a diagonally opposite corner may be reduced to further increase the angle. The ride heights at the other corners may either not be changed at all, or may be raised and lowered to a lesser extent.

In some, but not necessarily all examples the method 1000 may adjust a headlamp aim setting to maintain a predetermined beam direction relative to a horizontal horizon, to compensate for the modified pitch of the vehicle 100.

In some, but not necessarily all examples operation 1020 may further comprise alerting the driver to the modified suspension control via HMI 520. The driver may be presented with approach/departure angle information for example, or a simpler alert. The alert can be rendered prior to initiation of the ramp angle change. In some examples the alert can indicate which of the approach angle and the departure angle is most at risk of body-to-ground contact.

In one embodiment, if one of the approach and departure angles is sufficient to clear the ramp 202 but the other is not, the method 1000 may nonetheless raise both vehicle ramp angles in sequence (e.g. transitioning from FIG. 6A to 6B, or 7A to 7B). In another embodiment, the method 1000 may only raise the vehicle ramp angle that is not sufficient to clear the ramp 202.

If the ride height of the trailing overhang needs to be raised (e.g. FIGS. 6B, 7B), operations 1022 and 1024 are performed. Operation 1022 defines a trigger condition, determining whether the set of leading wheels has mounted the ramp 202. Methods for determining whether the set of leading wheels have mounted the ramp 202 have been described earlier.

Operation 1024 is then performed. At operation 1024, the vehicle ramp angle at the trailing overhang is increased. Sub-routine 1024A lowers the ride height at the leading wheels. Sub-routine 1024B raises the ride height at the trailing wheels. Examples are described earlier with references to FIGS. 6B, 7B.

Various examples were described in relation to operation 1020, which can also be applicable to operation 1024 (with the relevant ends of the vehicle swapped).

Although embodiments of the present invention have been described in the preceding paragraphs with reference to various examples, it should be appreciated that modifications to the examples given can be made without departing from the scope of the invention as claimed. For example, detection of the ramp (operation 1004) could be omitted in favour of a manual judgment by the driver. Optionally, the trigger conditions (operations 1014, 1018, 1022) could be omitted in favour of a manual judgement by the driver. The active suspension control could be a predetermined pattern based on a manual trigger. The manual trigger can comprise the control system 300 receiving a driver-selection of one of the front or rear overhang of the vehicle, and then the control system 300 can increase the approach/departure angle associated with the selected overhang in response. In another embodiment, the method 1000 is partially automated, with some operations up to the driver and others determined by the control system 300.

For purposes of this disclosure, it is to be understood that the controller(s) described herein can each comprise a control unit or computational device having one or more electronic processors. A vehicle 100 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controller may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Terrain modes are defined. Different terrain modes control one or more vehicle subsystems according to different sets of configurations. A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related configurations such as a differential locking setting and/or a traction control setting. Additionally, or alternatively, other configurations could be adjusted such as: a suspension setting; a ride height setting; a suspension damper setting; a throttle response setting; a gear shift point setting; a vehicle braking or traction control setting; a torque distribution setting; a locking/lockable differential setting; a torque shaping setting; or a steering weighting setting. The configurations may be predetermined or reconfigurable.

A manual user selection may comprise use of a human-machine interface input device. The input device may comprise an engine start button. The input device may comprise a terrain mode selector. In some examples, a terrain mode may be changeable automatically.

It will be appreciated that various changes and modifications can be made to the present invention without departing from the scope of the present application.

The blocks illustrated in FIG. 5 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle, the control system comprising one or more controller, wherein the control system is configured to:
   detect a ramp approached by an overhang of the vehicle;
   in dependence on detecting the ramp, control the active suspension system to modify a relative ride height between a leading ride height at a set of leading wheels of the vehicle and a trailing ride height at a set of trailing wheels of the vehicle, to increase a ramp angle of the vehicle relative to the ramp; and
   determine intended vehicle movement, wherein the ramp angle of the vehicle is increased in dependence on the determination of intended vehicle movement and detection of the ramp in a path of the intended movement of the vehicle.

2. The control system of claim 1, configured to determine whether a ramp angle condition is satisfied, comprising:
determining a parameter indicative of the ramp angle; and
determining whether the parameter exceeds a limit,
wherein the ramp angle is increased in dependence on the parameter exceeding the limit.

3. The control system of claim 2, wherein determining whether the ramp angle condition is satisfied comprises at least one of:
determining whether the parameter exceeds an approach angle limit associated with an approach angle of the vehicle; and
determining whether the parameter exceeds a departure angle limit associated with a departure angle of the vehicle,
wherein the ramp angle is increased in dependence on the parameter exceeding at least one of the approach angle limit and departure angle limit.

4. The control system of claim 3, configured to determine the approach angle limit and the departure angle limit in dependence on at least one of:
a ride height of the vehicle;
a current prevailing roll angle of the vehicle;
an angular rate associated with vehicle roll angle;
a current prevailing pitch angle of the vehicle; and
an angular rate associated with vehicle pitch angle.

5. The control system of claim 3, wherein the departure angle limit is different from the approach angle limit.

6. The control system of claim 2, wherein if the parameter exceeds an upper threshold, the ramp angle is not increased and/or a warning signal is generated in dependence on the parameter exceeding the upper threshold.

7. The control system of claim 1, wherein controlling the active suspension system comprises at least one of:
raising the leading ride height; and
lowering the trailing ride height.

8. The control system of claim 7, configured to:
determine that the vehicle is within a predetermined proximity of the ramp; and
enable the control of the active suspension system to increase the ramp angle of the vehicle at a leading overhang of the vehicle relative to the ramp in dependence on the vehicle being within the predetermined proximity.

9. The control system of claim 1, configured to:
determine that the set of leading wheels has mounted the ramp; and
control the active suspension system to increase the ramp angle of the vehicle at a trailing overhang of the vehicle relative to the ramp, wherein controlling the active suspension system comprises at least one of:
raising the trailing ride height; and
lowering the leading ride height.

10. The control system of claim 9, wherein determining that the set of leading wheels has mounted the ramp is dependent on data from at least one of:
an acceleration sensor;
a speed sensor; and
an imaging sensor.

11. The control system of claim 1, wherein the determination of intended vehicle movement is dependent on one or more of:
a torque request being greater than a threshold;
a vehicle braking parameter being less than a threshold;
a vehicle speed request parameter being greater than a threshold; and
an indication that a torque source of the vehicle is coupled to a set of drive wheels of the vehicle.

12. The control system of claim 1, wherein detecting the ramp is dependent on information from a topography detection sensor.

13. The control system of claim 1, configured to determine whether the vehicle is in a forward gear or a reverse gear,
wherein if the vehicle is in a forward gear, detecting the ramp is dependent on a forward-facing sensor, and
wherein if the vehicle is in a reverse gear, detecting the ramp is dependent on a rearward-facing sensor.

14. The control system of claim 1, configured to determine whether the vehicle is in a towing condition, wherein if the vehicle is in a towing condition the ramp angle is not increased.

15. The control system of claim 14, configured to generate a warning signal in dependence on the vehicle being in a towing condition.

16. The control system of claim 1, configured to determine whether the vehicle is in a first terrain mode or a second terrain mode,
wherein if the vehicle is in the first terrain mode the ramp angle is not increased, and wherein if the vehicle is in the second terrain mode the ramp angle is increased,
wherein in the first and second terrain modes one or more vehicle subsystems are controlled according to different sets of configurations.

17. An active suspension system comprising the control system of claim 1.

18. A vehicle comprising the control system of claim 1.

19. A method of controlling an active suspension system of a vehicle, the method comprising:
detecting a ramp approached by an overhang of the vehicle;
in dependence on detecting the ramp, controlling the active suspension system to modify a relative ride height between a leading ride height at a set of leading wheels of the vehicle and a trailing ride height at a set of trailing wheels of the vehicle, to increase a ramp angle of the vehicle relative to the ramp; and
determining intended vehicle movement, wherein the ramp angle of the vehicle is increased in dependence on the determination of intended vehicle movement and detection of the ramp in a path of the intended movement of the vehicle.

20. A non-transitory computer readable medium having stored thereon software that, when executed, is arranged to perform a method according to claim 19.

* * * * *